United States Patent [19]

Bergen

[11] 3,961,950
[45] June 8, 1976

[54] IMAGING SYSTEM
[75] Inventor: Richard F. Bergen, Ontario, N.Y.
[73] Assignee: Xerox Corporation, Stamford, Conn.
[22] Filed: Jan. 10, 1975
[21] Appl. No.: 540,299

[52] U.S. Cl. .................................... 96/1.1; 96/1 R
[51] Int. Cl.² ........................................ G03G 16/00
[58] Field of Search.................. 96/1 R, 1.5, 1.1, 35

[56] References Cited
UNITED STATES PATENTS 2,896,507   7/1959   Mast et al. ............................. 96/1.1
3,716,359   2/1973   Sheridon ............................... 96/1.1

*Primary Examiner*—John D. Welsh
*Attorney, Agent, or Firm*—James J. Ralabate; Michael H. Shanahan; Gaetano D. Maccarone

[57] ABSTRACT

A method for reversing the sense of an input image which employs an electro-optic image recorder and novel imaging technique. An unscreened electro-optic image recorder is sequentially exposed to a grating pattern and then to a reading image. The grating exposure produces large surface deformations on the recorder and the bright areas of the imagewise exposure reduce and/or remove the deformations.

21 Claims, 4 Drawing Figures

IMAGING SYSTEM

BACKGROUND OF THE INVENTION

This invention relates generally to image reversal systems, and specifically to such systems which manipulate the input image to an electro-optic image recorder in such a manner as to allow selection of image output sense.

Every image exhibits a character relative to an object or original image which is referred to as its "sense". If, for instance, an image, in monochrome, corresponds point for point, black to black and white to white with the object, the image is said to be a positive. If, on the other hand, the colors are reversed, the image is a negative, or opposite in sense to the object.

Positive to negative, and vice versa, image conversion can be advantageously employed in a number of processes, including, for example, microfilm fabrication and duplication.

As mentioned above, the instant invention employs a broad class of imaging members which record optical images by an imagewise distribution of photo-generated voltages or current acting upon a voltage or current-alterable recording medium. Typically, in these members, imagewise activating radiation is spatially modulated at a favorable spatial frequency before it is incident on a photoconductor, which allows charge carriers to move in an external electric field. These charge carriers interact with a voltage or current-sensitive member which in turn modulates light.

U.S. Pat. No. 2,896,507 describes an imaging member which includes a photoconductive layer on a deformable layer sandwiched between a pair of electrodes, one of which is a thin metallic layer overlying the deformable layer. In operation, imagewise activating radiation is directed upon the member and an electrical field is established across the photoconductive and deformable layers thus causing these layers to deform in image configuration. The member is described as being capable of functioning as an image intensifier since the deformation image may then be read out with a high intensity light source and a Schlieren-type optical system.

Recently, a major advance in the art was made by Sheridon, who disclosed the Ruticon (derived from the Greek words "rutis" for wrinkle and "icon" for image) family of imaging members wherein the voltage-sensitive, light modulating recording medium comprises a deformable elastomer layer and a photoconductive material may be provided as a separate layer or incorporated in the elastomer layer. For a detailed description of the Ruticon devices, see IEEE Transactions on Electron Devices, Sept., 1972, and U.S. Pat. No. 3,716,359. Various different embodiments for establishing electric field across the elastomer layer are described. U.S. Pat. No. 3,716,359 is hereby expressly incorporated herein by reference for its teachings relating to recorder-structures and materials.

Image recorders within this broad class of imaging devices, including Ruticons, respond well to spatial frequency components of the image which lie within a given region and respond poorly to spatial frequencies which lie outside this region. In the normal course, when it is desired to obtain relatively uniform response to all spatial frequencies that lie within a relatively broad region the optical image is modulated at a spatial frequency that lies within the region of favorable response of the imaging device. Typically, this modulation is accomplished by inserting an optical screen, e.g., a Ronchi ruling, immediately adjacent the photoconductor.

Sheridan discloses (U.S. Pat. No. 3,716,359) several embodiments of electro-optical imaging members and several variations upon their useful application. The instant invention employs these members in a novel fashion to achieve image reversal.

SUMMARY OF THE INVENTION

It is, therefore, an object of this invention to provide a simple method for producing an image sense reversal.

It is another object of this invention to provide a method of image sense reversal which employs an electro-optic image recorder.

Another object of this invention is to provide a method of image sense reversal which employs an unscreened reflection type electro-optic image recorder.

Another object of this invention is to provide a method of image sense reversal which employs an unscreened transmission type electro-optic image recorder.

These and other objects are accomplished by providing a method for reversing the sense of an input image which employs an electro-optic image recorder and novel imaging technique. An unscreened electro-optic image recorder is sequentially exposed to a grating pattern and then to a readin image. The grating exposure produces large surface deformations on the recorder and the bright areas of the imagewise exposure reduce and/or remove the deformations.

BRIEF DESCRIPTION OF THE DRAWINGS

The advantages of this invention will become apparent upon consideration of the following detailed disclosure of the invention, especially when taken in conjunction with the accompanying drawings wherein.

DESCRIPTION OF THE PREFERRED EMBODIMENTS

Figure 1:
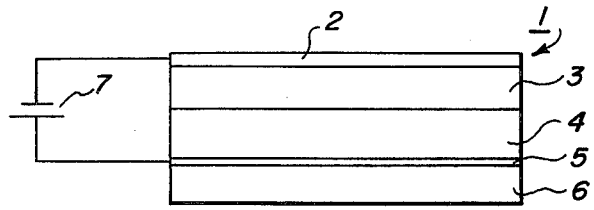
FIG. 1 is a partially schematic, partially cross-sectional view of an optical recorder suitable for use in the instant invention.

Referring now to FIG. 1, an exemplary imaging member from the Ruticon family is shown. Many modifications of the elements are known in the art, but generally imaging member 1 is comprised of a substrate 6 which is a transparent non-conductive layer having thereon a conductive transparent layer 5. Layer 4 is a photoconductive material which will allow the passage of more electrical charges into those regions which are exposed to light. Elastomer 3 may be of a class of elastomeric solid materials including both natural, such as natural rubber and synthetic polymers which have rubber-like characteristics, i.e., elastic, and include materials such as styrene-butadiene, poly-butadiene, neoprene, butyl, polyisoprene, polysiloxane, nitrile, and ethylene propylene rubbers.

A thin continuous conductive layer 2 is placed on the surface of the elastomer, and is flexible enough to follow the deformations of the elastomer. In a preferred embodiment, this layer is highly reflective and opaque.

Power supply 7 provides DC voltages of one polarity to form a deformation image on the surface of the elastomer. The polarity required depends primarily upon the nature of the photoconductor. Power supply 7 must be capable of being turned off to erase the image, or undergo a shift in polarity to more rapidly erase the image. Supply 7 may also be AC or a combination of AC and DC. The external electrical circuit may also include suitable switching means (not shown). Also not shown, is an optional floodlight which may facilitate image erasure.

Figure 2:
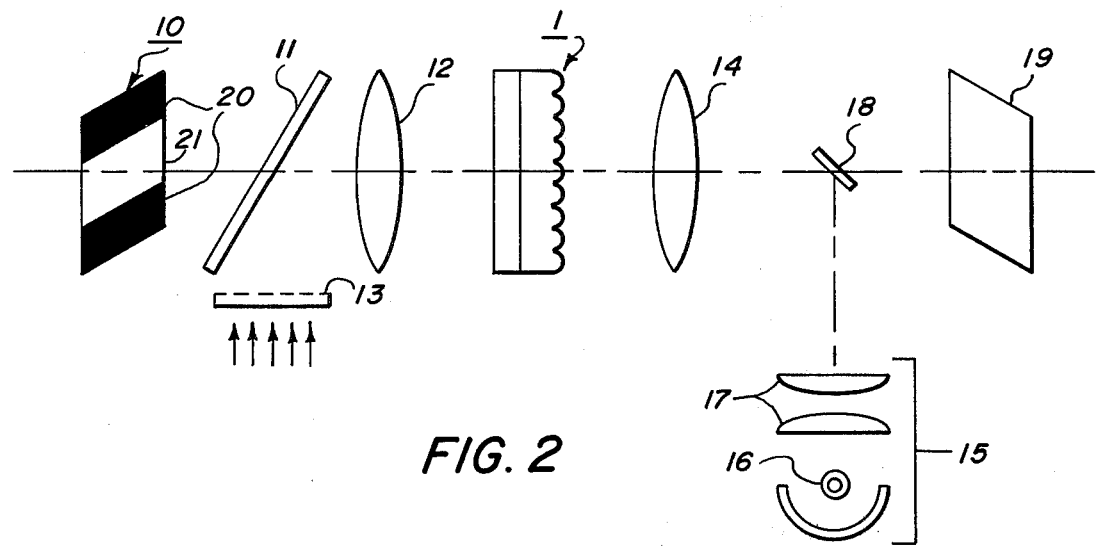
FIG. 2 is a partially schematic, cross-sectional view of the system of the instant invention showing the grating exposure step.
Figure 3:
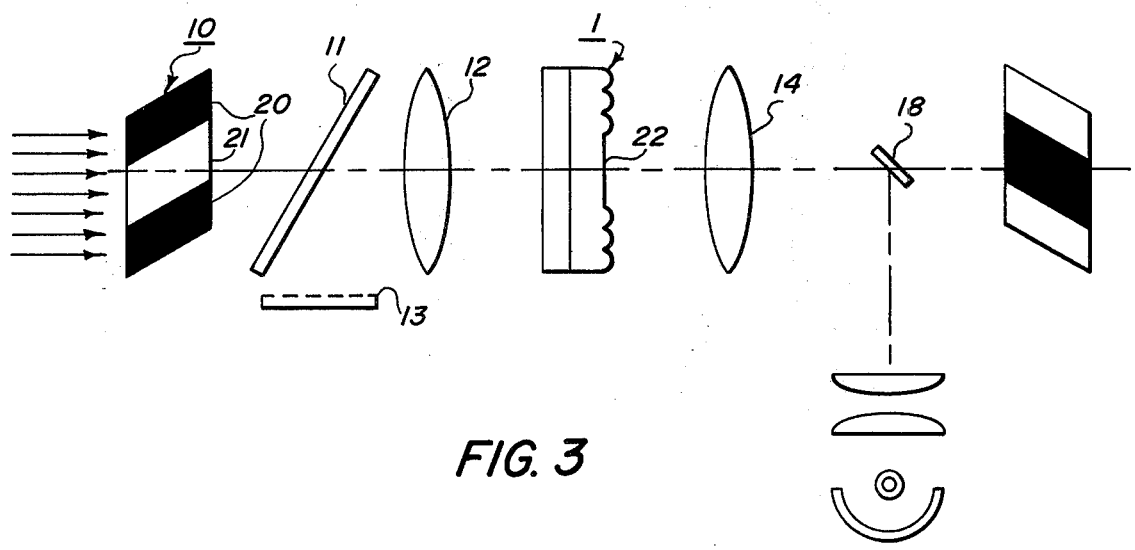
FIG. 3 is a partially schematic, cross-sectional view of the system of the instant invention showing the image-wise exposure step.

Referring now to FIGS. 2 and 3, a preferred embodiment of the instant invention will be described. The heart of the system is imaging member 1 which is an unscreened electro-optical image recorder such as shown in FIG. 1. The elements to the left of recorder 1 serve to provide image input and those to the right establish a viewable output.

Original image 10, a transparency for example, is in optical alignment with beam splitter 11, imaging lens 12 and recorder 1. The beam splitter may take any of the forms known in the art, but is shown as a partially transmitting, partially reflecting mirror-like structure. Positioned below the beam splitter is a grating 13 which may be made to illuminate the recorder via the beam splitter. Several obvious structures may be used as the grating, as for example, a transparent substrate with an opaque bar pattern thereon. According to principles well-known in the art, the frequency of the imaged bar pattern is matched to the deformation frequency of the elastomer in recorder 1.

To the right of recorder 1 is a readout lens 14 and condensing system 15 which is comprised of illumination source 16, lenses 17 and mirror stop 18. The readout system converts the phase modulated image into an intensity modulated image at the image plane 19.

The first operative step of the method is shown in FIG. 2. The grating 13 is illuminated and projected onto the recorder 1 which produces large surface deformations on the surface thereof corresponding to the grating pattern. Then, as shown in FIG. 3, the object 10 is illuminated and projected onto the recorder. Note that the object is made up, for example, of two dark areas 20 and one light area 21. The bright area of the object discharges the photoconductor of the recorder and destroys the periodic charge pattern, thereby removing and/or reducing the deformation in these regions (see region 22 of recorder 1). The image read out at the image plane 19 using diffracted light is the reverse of the object, i.e., the previous dark areas are light and the previous light areas are dark.

The term "grating" as used herein is intended to encompass a structure equivalent to, or the same as, the optical screens described and known in the prior art. Generally, a grating consists of a regularly spaced bar pattern of alternating strips of light-absorbing and light-transmitting areas. Additional bar patterns may be used in a multitude of configurations. For instance, a very useful pattern comprises two sets of stripes at any relative angle to each other, each set made up of alternating strips of light-absorbing and light-transmitting areas. The optimum angular relationship in this latter pattern is 90°.

The above system may be modified to perform particularly well in the production of color transparencies or prints from sequential images on a CRT. Here it should be noted that highly sophisticated techniques are known in the art from producing images representative of color separation images on a CRT. Since this process does not form part of the instant invention, a detailed description will be dispensed with, attention being directed, for example, to color image scanning technologies.

The CRT image for one color separation negative image, red, for example, may be imaged onto the image recorder thereby, using the grating/object double exposure method, producing a positive output having good contrast and intensity characteristics. By employing the proper color filter in the readout, say red, the readout image may be exposed onto a color positive image recording material, for example, Kodachrome film for transparencies or Ektacolor professional paper for prints, both available from Kodak. Then a second CRT color separation negative image, green, for example, may be imaged onto the recorder in the same manner filtered with green and exposed onto the color recording material. These steps may be repeated for the blue color separation negative image, thus producing the desired image makeup. Processing the photomaterial now produces a full color positive.

Instead of projecting the images onto a color negative image recording material, they may be projected sequentially onto a panchromatic photoreceptor in registry and sequentially developed to produce a full color image. Alternatively, each image may be projected onto a separate photoreceptor sensitive to the specific color and transferred to a single receiver.

Figure 4:
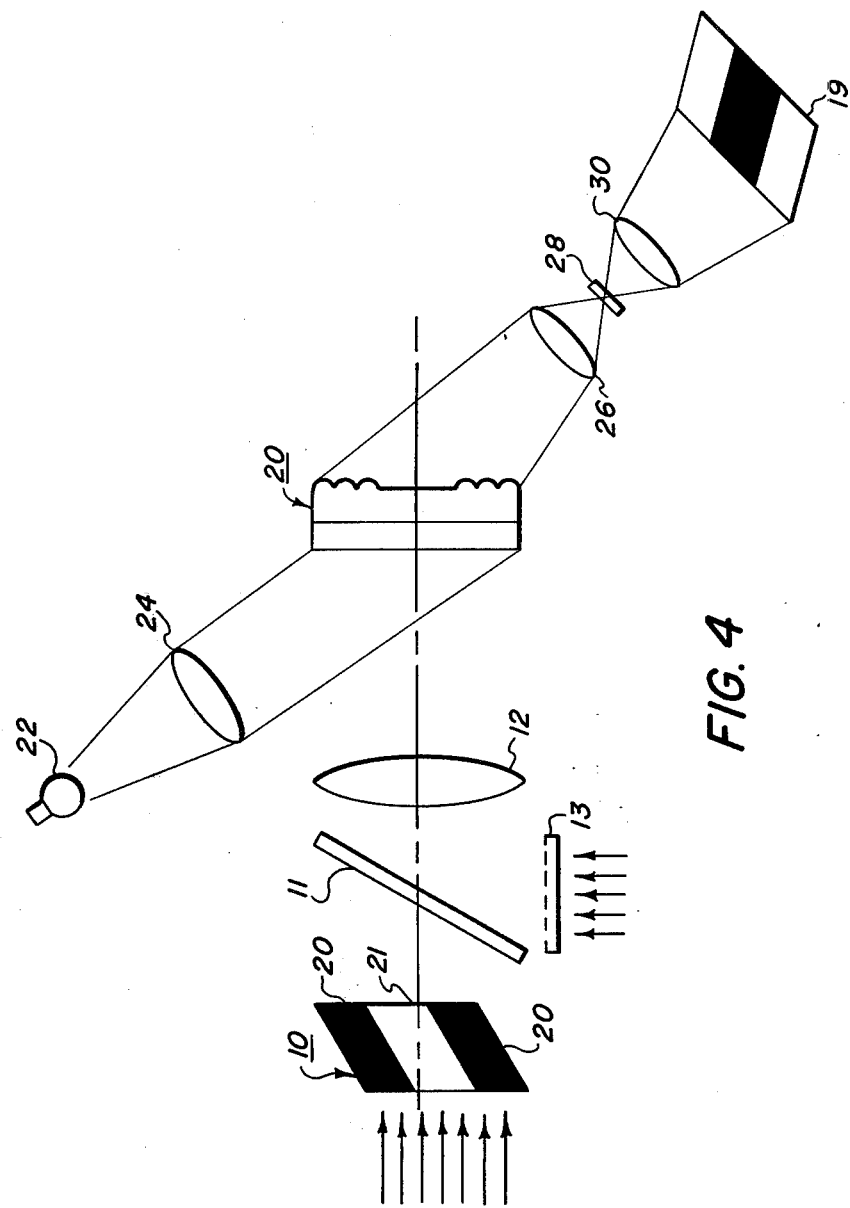
FIG. 4 is a partially schematic, cross-sectional view of another embodiment of the system of the instant invention.

Another preferred embodiment, shown to FIG. 4, employs a transmission type image recorder. In a system such as this, a recorder like shown in FIG. 1 is used, except that each of the elements or layers are transparent or semi-transparent to the readout radiation used, and at least the photoconductive layer is sensitive to the readin radiation.

Image recorder 20 has the characteristics discussed in the immediately preceeding paragraph and is provided with a deformation image according to the described grating/exposure process. The radiation used to expose the photoconductive layer to both the grating and the original image is of such wavelength as to activate the photoconductor. Readout is accomplished by directing radiation from source 22 (radiation from source 22 being of a wavelength incapable of activating the photoconductor) through lens 24, through the image modulated recorder 20, through lens 26, by stop 28 where the reflected light, or zero order, is removed, through lens 30 and onto image plane 19. Various combinations of radiation, visible and invisible, may be used for activation and readout, e.g., red for activation and green for readout.

It will be understood that various other changes of the details, materials, steps, arrangements of parts and uses which have been herein described and illustrated in order to explain the nature of the invention will occur to and may be made by those skilled in the art, upon a reading of this disclosure, and such changes are intended to be included within the principles and scope of this invention.

For example, in place of the grating 13, a fiber optic faceplate as disclosed in copending U.S. Pat. application No. 507,910, filed on Sept. 20, 1974, with a removable or sliding grating, may be used for the grating exposure step and removed for the imagewise exposure step.

Also, other means can be used to charge the member besides the reflective metallic layer, e.g., layer 2 may be a transparent conductive polymer, an ionized gas or a liquid.

Furthermore, it will be appreciated that image recorders other than those in the Ruticon family may be used in the instant invention with satisfactory results.

Although specific components, proportions and process steps have been stated in the above description of preferred embodiments of the invention, other suitable materials proportions and process steps, as listed herein, may be used with satisfactory results and varying degrees of quality. In addition, other materials which exist presently or may be discovered may be added to materials used herein to synergize, enhance or otherwise modify their properties.

What is claimed is:

1. A method of obtaining a reverse sense image from an original comprising:
   a. providing an unscreened electro-optic image recorder;
   b. exposing said recorder to activating radiation through a grating pattern, thereby forming surface deformations on said recorder corresponding to said grating pattern; then,
   c. exposing said recorder to an imagewise pattern of activating radiation corresponding to the original image, thereby forming an image in said recorder which, when the higher order diffracted light is viewed, is opposite in sense to the original.

2. The method of claim 1 wherein said grating pattern comprises a first substantially parallel set of stripes of alternating light-transmitting and light-absorbing areas.

3. The method of claim 2 wherein said grating further comprises a second set of stripes of alternating light-transmitting and light-absorbing areas perpendicular to said first set of stripes.

4. The method of claim 1 wherein said recorder is reflection type image recorder, and further including a reflection type readout system for projecting the image information on said recorder onto a viewing plane.

5. The method of claim 4 further including a photosensitive member at said viewing plane, whereby said photosensitive member is exposed to the opposite sense image.

6. The method of claim 5 wherein said photosensitive member is panchromatic.

7. The method of claim 6 wherein said panchromatic photosensitive member is a positive imaging material.

8. The method of claim 5 wherein said image recorder comprises a layer of voltage or current-sensitive, light modulating material overlying a layer of photoconductive material.

9. The method of claim 8 wherein said voltage or current-sensitive, light modulating material comprises an elastomer material.

10. The method of claim 9 wherein said image recorder further includes a transparent conductive substrate upon which said photoconductive layer resides.

11. The method of claim 10 wherein said image recorder further includes a flexible conductive metallic layer overlying said light modulating layer.

12. The method of claim 1 wherein said image recorder is transparent and further including a transmission type readout system for projecting the image information on said recorder onto a viewing plane, the radiation from said readout system being incapable of activating said image recorder.

13. The method of claim 12 further including a photosensitive member at said viewing plane, whereby said photosensitive member is exposed to the opposite sense image.

14. The method of claim 13 wherein said photosensitive member is panchromatic.

15. The method of claim 13 wherein said panchromatic photosensitive member is a positive imaging material.

16. The method of claim 13 wherein said image recorder comprises a layer of voltage or current-sensitive, light modulating material overlying a layer of photoconductive material.

17. The method of claim 16 wherein said voltage or current-sensitive, light modulating material comprises an elastomer material.

18. The method of claim 17 wherein said image recorder further includes a transparent conductive substrate upon which said photoconductive layer resides.

19. The method of claim 18 wherein said image recorder further includes a conductive liquid layer overlying said light modulating layer.

20. The method of claim 18 wherein said image recorder further includes a conductive ionized gas layer overlying said light modulating layer.

21. The method of claim 18 wherein said image recorder further includes a conductive polymer layer overlying said light modulating layer.

* * * * *